United States Patent [19]
Kaneko

[11] Patent Number: 5,511,221
[45] Date of Patent: Apr. 23, 1996

[54] PARALLEL PROCESSOR SYSTEM FOR DETECTING THE END OF DATA TRANSMISSION

[75] Inventor: Katsuyuki Kaneko, Osaka, Japan

[73] Assignee: Matsushita Electric Industrial Co., Ltd., Osaka, Japan

[21] Appl. No.: 366,378

[22] Filed: Dec. 29, 1994

Related U.S. Application Data

[63] Continuation of Ser. No. 913,358, Jul. 15, 1992, abandoned.

[30] Foreign Application Priority Data

Jul. 16, 1991 [JP] Japan .................................. 3-175419
Jul. 15, 1992 [JP] Japan .................................. 7-913358

[51] Int. Cl.[6] ................................................. G06F 15/16
[52] U.S. Cl. ............. 395/800; 395/200.19; 364/DIG. 1; 364/259; 364/230; 364/231.9; 364/239
[58] Field of Search ........................... 395/200, 800, 395/700, 650, 725, 325, 275, 425, 200.19

[56] References Cited

U.S. PATENT DOCUMENTS

| | | | |
|---|---|---|---|
| 4,493,053 | 1/1985 | Thompson | 395/250 |
| 4,989,131 | 1/1991 | Stone | 395/375 |
| 5,021,947 | 6/1991 | Campbell et al. | 382/49 |
| 5,038,386 | 8/1991 | Li | 382/49 |
| 5,083,265 | 1/1992 | Valiant | 395/800 |
| 5,117,420 | 5/1992 | Hillis et al. | 370/60 |
| 5,230,079 | 7/1993 | Grondalski | 395/800 |
| 5,239,654 | 8/1993 | Ing-Simmons et al. | 395/800 |
| 5,243,699 | 9/1993 | Nickolls et al. | 395/800 |
| 5,280,474 | 1/1994 | Nickolls et al. | 371/49.3 |
| 5,333,268 | 7/1994 | Douglas et al. | 395/200 |

OTHER PUBLICATIONS

K. Kaneko et al., *Processing Element Design for a Parallel Computer*, IEEE Micro Magazine, vol. 10, No. 2, pp. 30 et seq., (Apr. 1990).

*Primary Examiner*—Mehmet Geckil
*Attorney, Agent, or Firm*—Willian Brinks Hofer Gilson & Lione

[57] ABSTRACT

In each processing device of a parallel processor system, a processor outputs a signal when all the transmit data are transmitted to a router. A latch receives the signal from the processor to output a signal set to HIGH. To an AND gate are inputted the signal set to HIGH outputted from the latch and a signal set to HIGH which indicates that the router has no receive data received from a network. The parallel processor system performs AND operation on the outputs of the AND gates of all the processing devices, and detects that a data transmit/receive processing is completed among all the processing devices according to the results of AND operation.

2 Claims, 10 Drawing Sheets

DBmn
(m,n = 1,2,3)

PARALLEL PROCESSOR SYSTEM FOR DETECTING THE END OF DATA TRANSMISSION

This is a continuation application of application Ser. No. 08/913,358 filed Jul. 15, 1992 now abandoned.

BACKGROUND OF THE INVENTION

The present invention relates to a parallel processor system, and more particularly to a parallel processor system for performing, at a high speed, a synchronous processing and the processing of deciding the end of data transmission/receipt among a plurality of processors, memories and the like.

Recently, there has been attempted that a plurality of relatively small-scale processors are caused to execute large scale computation at a higher speed than a single high-speed processor. Such a computer is generally referred to as a parallel processor system. In the case where problems are solved by means of the parallel processor system, it is necessary to exchange data among processors and synchronize processors. Accordingly, it is important that data exchange and synchronous processings are performed at a high speed in order to obtain a high-performance parallel processor system.

Figure 9:
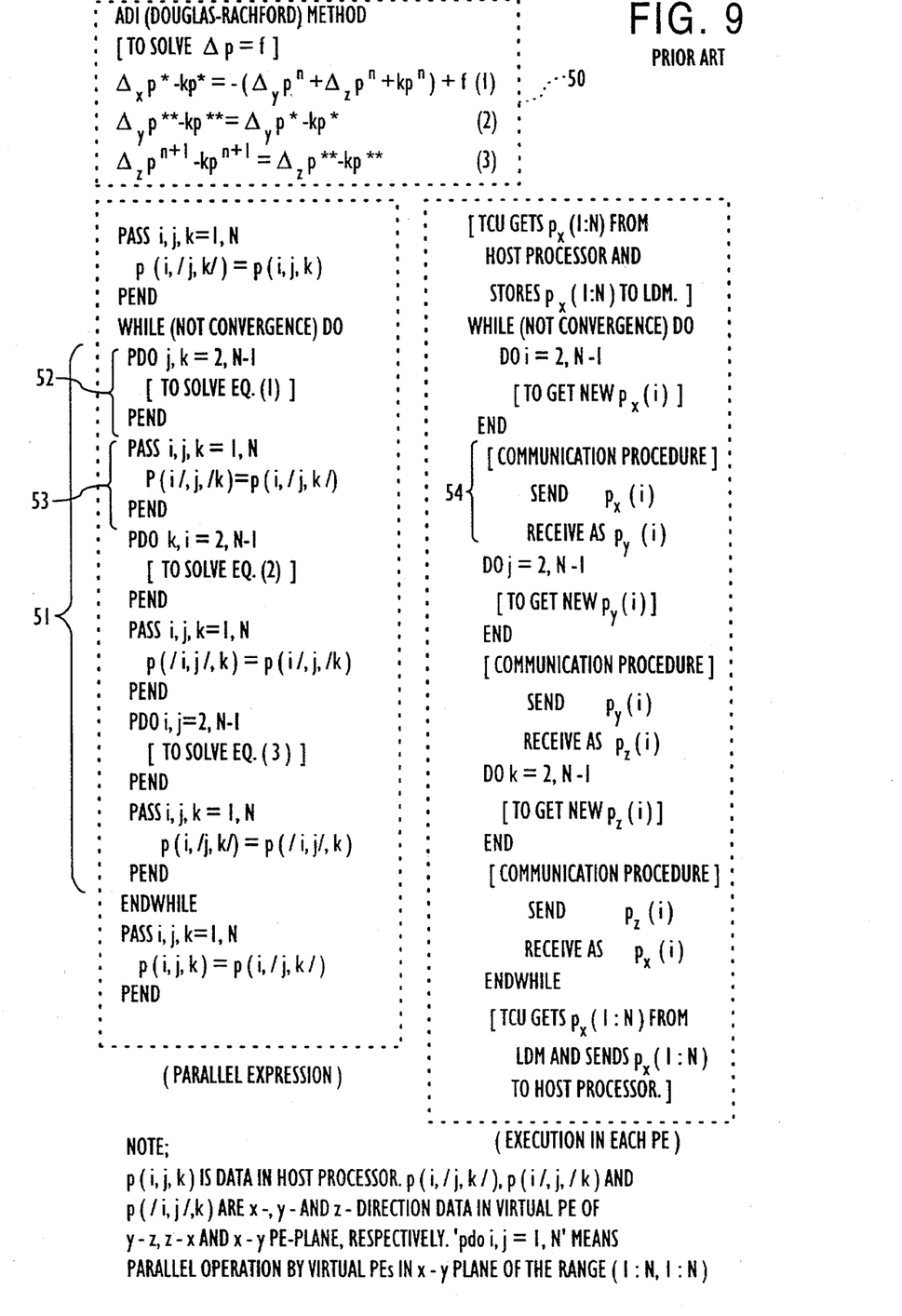
FIG. 9 is a flowchart showing the flow of processings in a parallel processor system according to the prior art.

In each processor of the parallel processor system, generally, an execution phase and a data transfer phase alternately appear. The execution phase executes operation. The data transfer phase transfers data between the processors. For example, such a state has been described on and after page 30, IEEE MICRO magazine Vol. 10, No. 2 (April 1990). As shown in FIG. 9, in the case where a partial differential equation 50 is solved by means of a computer, calculation is repeated until an integral of the partial differential equation 50 converges in a processing 51. In the processing 51, an arithmetic processing 52 and a data transmit/receive processing 53 are alternately repeated. In the arithmetic processing 52, each processor forming the computer independently performs operation. In the data transmit/receive processing 53, data is transmitted and received between the processors. The data transmit/receive processing 53 is executed by the processor in the procedure shown in a processing 54. More specifically, a predetermined number of data are transmitted to a network by which the processors are connected to one another. The same number of data are received from the network. At this time, synchronization is carried out to check whether the processor precisely receives the predetermined number of data. If the synchronization is not correct, the data transmit/receive processing is executed again. The state of a synchronous processing will be described with reference to FIG. 10.

Figure 10:
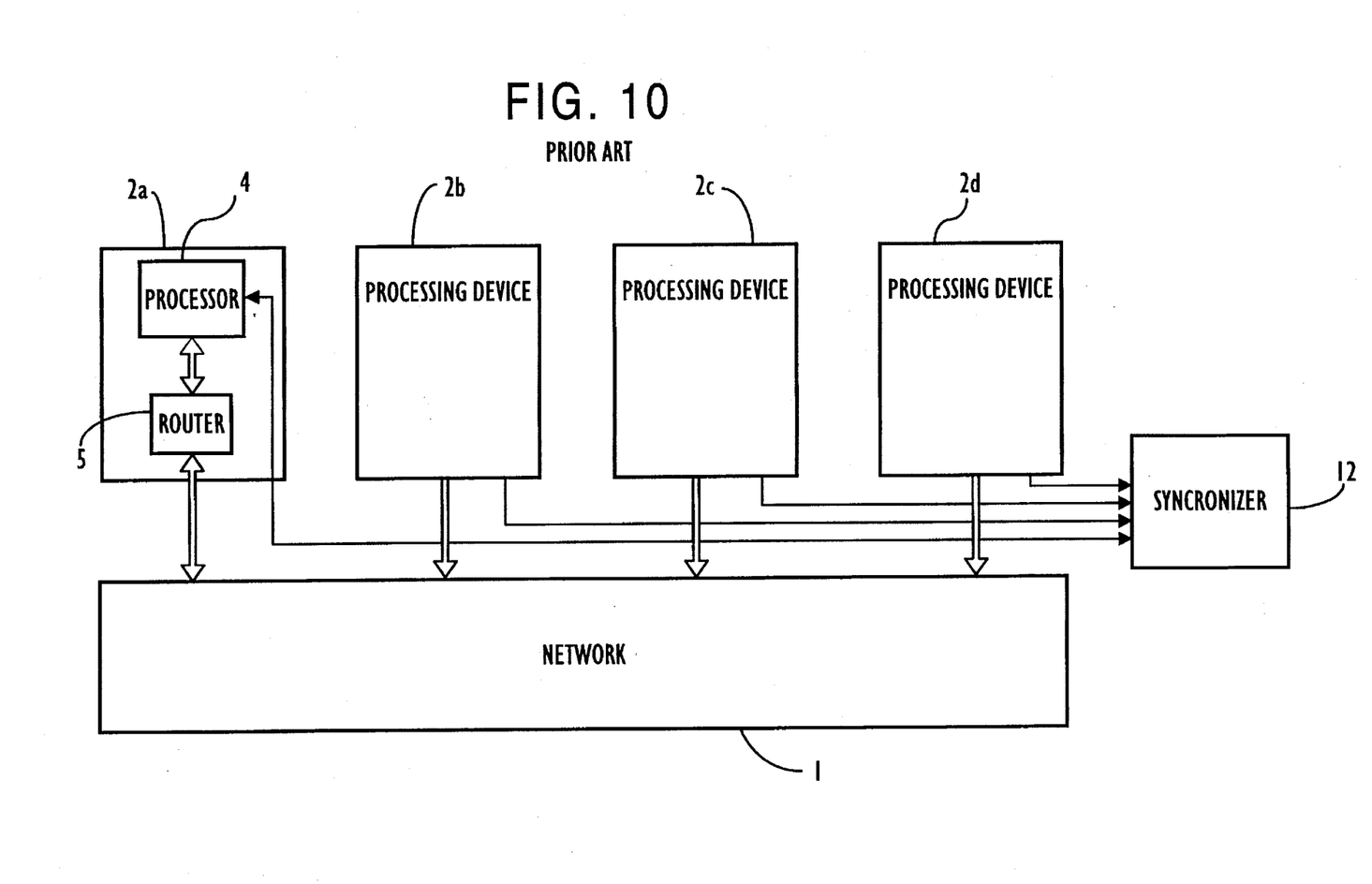
FIG. 10 is a block diagram showing the parallel processor system according to the prior art.

FIG. 10 is a block diagram showing a parallel processor system according to the prior art. In FIG. 10, the reference numerals 2a, 2b, 2c and 2d denote processing devices of the parallel processor system. Each of the processing devices 2a to 2d includes a processor 4 and a router 5. The router 5 is connected to a network 1. The parallel processor system comprises a synchronizer 12 for synchronizing the processors 4 of the processing devices 2a to 2d. The synchronizer 12 is connected to the processors 4 of the processing devices 2a to 2d.

In the conventional parallel processor system shown in FIG. 10, the synchronous processing of the data transmit/receive processing 53 shown in FIG. 9 is carried out in the following manner. When the data transmit/receive processing 53 is started, the processor 4 gives the router 5 a command to transmit and receive a predetermined number of data in the processing devices 2a to 2d. The router 5 counts the receive data. If the number of the receive data is a predetermined one, a receive ending flag is raised in the router 5. The processor 4 intermittently observes whether the receive ending flag is raised. When the receive ending flag is ascertained, the processor 4 transmits a synchronous request signal to the synchronizer 12. The synchronizer 12 observes the synchronous request signals transmitted from the processing devices 2a to 2d. When all the synchronous request signals transmitted from the processing devices 2a to 2d become complete, the synchronizer 12 transmits synchronous signals to the processing devices 2a to 2d. In response to the synchronous signals, the processing devices 2a to 2d simultaneously control the next processing.

In the conventional parallel processor system mentioned above, however, it is necessary for the processors 4 of the processing devices 2a to 2d to generate and transmit data, and intermittently observe whether the receive ending flag is raised in the router 5. For this reason, it is necessary for the processor 4 to use a part of arithmetic control capabilities thereof. Accordingly, the burden of the processor 4 is increased so that an arithmetic processing speed is lowered. It is necessary for the router 5 to count the number of the receive data so as to ascertain that the processing of receiving the receive data is completed. Consequently, the router 5 should have a complicated hardware configuration. In a processing in which the number of receive data to be received by the routers 5 of the processing devices 2a to 2d is determined depending on the state of processing execution, it is necessary for the router 5 to receive a predetermined number of receive data plural times under the detailed control of the processor 4 at the time of processing execution. In the above-mentioned parallel processor system, furthermore, it is required that the synchronizer 12 is provided so as to detect that all the data transmit/receive processings of the processing devices 2a to 2d are completed and to return the same to the processing devices 2a to 2d.

SUMMARY OF THE INVENTION

To solve the above-mentioned problems, it is an object of the present invention to provide a high-speed parallel processor system capable of lightening the burden of a processor caused by observing data transmission and receipt, and having a simple structure in which a data transmit/receive processing and a synchronous processing thereof are integrated.

To achieve the above-mentioned object, the parallel processor system of the present invention comprises a plurality of processing devices, and a network for connecting the processing devices to one another, each of the processing devices including a processor, a router for receiving the transmit data generated by the processor and transmitting the same to the network, and for receiving the receive data generated by other processing devices through the network and transmitting the same to the processor, a latch for receiving a signal outputted from the processor which indicates that all the transmit data have been transmitted from the processor to the router, and outputting a correspondent transmit ending signal, and an AND output means for performing AND operation on an empty flag signal which indicates that the router has no receive data from the network and the transmit ending signal outputted from the latch, and outputting the result of AND operation, wherein the parallel processor system performs AND operation on all the results of AND operation outputted from the processing devices, and detects that all the transmit/receive data have been transferred in the processing devices according to the result of AND operation thus obtained.

With the above-mentioned structure, when all the transmit data are transmitted to the router, the processor of each processing device outputs, to the latch, a signal which indicates that all the transmit data have been transmitted. Then, the latch outputs a correspondent transmit ending signal on the receipt of the signal outputted from the processor. The transmit data transmitted from the processor are held in the router. The router sequentially transmits the transmit data to the network. On the other hand, the receive data transmitted from other processing devices are received by the router through the network. The router sequentially transmits the receive data to the processor. When the router has no receive data, there is outputted an empty flag signal which indicates that the router has no receive data. To the AND output means are inputted the transmit ending signal outputted from the latch and the empty flag signal which indicates that the router has no receive data. The AND output means performs AND operation on the transmit ending signal and the empty flag signal, and outputs the results of AND operation.

AND operation is performed on all the results of AND operation outputted from the processing devices. According to the result of AND operation thus obtained, it is detected, in all the processing devices, that transmit/receive data transfer is completed, i.e., a data transmit/receive processing is completed. Consequently, it is possible to synchronize the ending of the data transmit/receive processing.

Accordingly, there can be provided a high-speed parallel processor system capable of lightening the burden of the processor of the processing device caused by observing whether data transmission and receipt are completed, and having a simple structure in which a data transmit/receive processing and a synchronous processing thereof are integrated.

To achieve the above-mentioned object, the parallel processor system of the present invention comprises a plurality of processing devices, and a network for connecting the processing devices to one another, each of the processing devices including a processor, a router for receiving the data generated by the processor and transmitting the same to the network, a latch for receiving a signal outputted from the processor which indicates that all the data have been transmitted from the processor to the router, and outputting a correspondent transmit ending signal, and an AND output means for performing AND operation on an empty flag signal which indicates that the router has no data from the processor and the transmit ending signal outputted from the latch, and outputting the result of AND operation, wherein the parallel processor system performs AND operation on all the results of AND operation outputted from the processing devices, and detects that all the data have been transferred in the processing devices according to the result of AND operation thus obtained.

With the above-mentioned structure, when all the data are transmitted to the router, the processor of each processing device outputs, to the latch, a signal which indicates that all the data have been transmitted. Then, the latch outputs a correspondent transmit ending signal on the receipt of the signal outputted from the processor. The data transmitted from the processor are held in the router. The router sequentially transmits the data to the network. When the router has no data, there is outputted an empty flag signal which indicates that the router has no data. To the AND output means are inputted the transmit ending signal outputted from the latch and the empty flag signal which indicates that the router has no data. The AND output means performs AND operation on the transmit ending signal and the empty flag signal, and outputs the result of AND operation.

AND operation is performed on all the results of AND operation outputted from the processing devices. According to the result of AND operation thus obtained, it is detected, in all the processing devices, that all the data have been transferred, i.e., a data transmit/receive processing is completed. Consequently, it is possible to synchronize the ending of the data transmit/receive processing.

Accordingly, there can be provided a high-speed parallel processor system capable of lightening the burden of the processor of the processing device caused by observing whether data transmission and receipt are completed, and having a simple structure in which a data transmit/receive processing and a synchronous processing thereof are integrated.

To achieve the above-mentioned object, the parallel processor system of the present invention comprises a first data bus group including a plurality of data buses, a second data bus group including a plurality of data buses, a first device group including a plurality of devices, each of which is connected to one of the data buses of the first data bus group, a second device group including a plurality of devices, each of which is connected to one of the data buses of the second data bus group, a plurality of data buffer devices, each of which includes an AND output means, and a plurality of transmit ending signal lines, each of which is connected to one of the devices of the first device group, wherein the first and second data bus groups are provided such that their data buses intersect like a lattice, the data buffer devices are provided on all the intersections of the data buses of the first and second data bus groups, each of the data buffer devices is connected to the data buses of the first and second data bus groups forming the correspondent intersection, each of the transmit ending signal lines transmits a transmit ending signal which is outputted from the device of the first device group corresponding to the transmit ending signal line and indicates that all the data have been transmitted, the data being fed from the device of the first device group to the data buffer device connected to the data bus which is connected to the device of the first device group, the AND output means performs AND operation on an empty flag signal indicating that the data buffer device to which the AND output means belongs has no data and a transmit ending signal transmitted through the transmit ending signal line connected to the device of the first device group which is connected to the data buffer device through the data bus of the first data bus group, and outputs the result of AND operation, and the parallel processor system performs AND operation on all the results of AND operation outputted from the AND output means of the data buffer devices which are connected to each data bus of the second data bus group, and detects that all the data have been transferred to the device of the second device group which is connected to the data bus of the second data bus group according to the result of AND operation thus obtained.

With the above-mentioned structure, the data is transmitted from each device of the first device group to the data bus of the first data bus group connected thereto. Then, the data thus transmitted is stored in the data buffer device provided on an intersection of the data bus of the first data bus group and the data bus of the second data bus group connected to the device of the second device group to which the data is to be transferred. Thereafter, the data stored in the data buffer device is transmitted to the device of the second device group through the data bus of the second data bus group.

When all the data are transmitted, each device of the first device group outputs, to the transmit ending signal line, a transmit ending signal which indicates that all the data have been transmitted. The transmit ending signal line is connected to the device of the first device group. The transmit ending signal outputted to the transmit ending signal line is transmitted to each of the data buffer devices connected to the data bus of the first data bus group. The data bus of the first data bus group is connected to the device of the first device group. When all the data are transmitted from the data buffer device to the device of the second device group, there is outputted an empty flag signal which indicates that the data buffer device has no data. In the data buffer device, the transmit ending signal and the empty flag signal are inputted to the AND output means of the data buffer device. The transmit ending signal is transmitted from the transmit signal line connected to the device of the first device group. The device of the first device group is connected to the data buffer device through the data bus of the first data bus group. The empty flag signal indicates that the data buffer device has no data. The AND output means performs AND operation on the transmit ending signal and the empty flag signal, and outputs the result of AND operation.

There is performed AND operation on all the results of AND operation outputted from the AND output means of the data buffer devices connected to the data bus of the second data bus group. According to the result of AND operation thus obtained, it is detected that all the data have been transferred to the device of the second device group connected to the data bus of the second data bus group.

Accordingly, there can be provided a high-speed parallel processor system capable of lightening the burden of the processor caused by observing whether data transmission and receipt are completed, and having a simple structure in which a data transmit/receive processing and a synchronous processing thereof are integrated.

In the case where the devices of the first and second device groups are processors, it is not necessary to observe whether all the data have been transferred from each processor of the first device group to each processor of the second device group. Consequently, there can be provided a high-speed parallel processor system capable of lightening the burden of the processor, and having a simple structure in which a data transmit/receive processing and a synchronous processing thereof are integrated.

In the case where each device of the first device group is a memory and each device of the second device group is a processor, it is not necessary to observe whether all the data have been transferred from the memory to the processor. Consequently, there can be provided a high-speed parallel processor system capable of lightening the burden of the processor, and having a simple structure in which a data transmit/receive processing and a synchronous processing thereof are integrated.

To achieve the above-mentioned object, the parallel processor system of the present invention comprises a first data bus group including a plurality of data buses, a second data bus group including a plurality of data buses, a first device group including a plurality of devices, each of which is connected to one of the data buses of the first data bus group, a second device group including a plurality of devices, each of which is connected to one of the data buses of the second data bus group, and a plurality of data buffer devices, each of which includes an ending indication register and an AND output means, wherein the first and second data bus groups are provided such that their data buses intersect like a lattice, the data buffer devices are provided on all the intersections of the data buses of the first and second data bus groups, each of the data buffer devices is connected to the data buses of the first and second data bus groups forming the correspondent intersections, the ending indication register outputs a transmit ending signal which indicates that all the data have been transmitted from the device of the first device group connected to the data buffer device, to which the ending indication register belongs, through the data bus of the first data bus group based on a data set by the device of the first device group, the AND output means performs AND operation on an empty flag signal indicating that the data buffer device to which the AND output means belongs has no data and a transmit ending signal outputted from the ending indication register of the data buffer device, and outputs the result of AND operation, and the parallel processor system performs AND operation on all the results of AND operation outputted from the AND output means of the data buffer devices which are connected to each data bus of the second data bus group, and detects that all the data have been transferred to the device of the second device group which is connected to the data bus of the second data bus group according to the result of AND operation thus obtained.

With the above-mentioned structure, the data is transmitted from each device of the first device group to the data bus of the first data bus group connected thereto. Then, the data thus transmitted is stored in the data buffer device provided on an intersection of the data bus of the first data bus group and the data bus of the second data bus group connected to the device of the second device group to which the data is to be transferred. Thereafter, the data stored in the data buffer device is transmitted to the device of the second device group through the data bus of the second data bus group.

When all the data are transmitted, each device of the first device group sets, to the ending indication register of the data buffer connected to the data bus of the first data bus group, data which indicates that all the data have been transmitted. The data bus of the first data bus group is connected to the device of the first device group. Then, the ending indication register of the data buffer device outputs a transmit ending signal based on the data set by the device of the first device group. The transmit ending signal indicates that all the data have been transmitted from the device of the first device group. When all the data are transmitted from the data buffer device to the device of the second device group, there is outputted an empty flag signal which indicates that the data buffer device has no data. In the data buffer device, the transmit ending signal and the empty flag signal are inputted to the AND output means of the data buffer device. The transmit ending signal is outputted from the ending indication register of the data buffer device. The empty flag signal indicates that the data buffer device has no data. The AND output means performs AND operation on the transmit ending signal and the empty flag signal, and outputs the result of AND operation.

There is performed AND operation on all the results of AND operation outputted from the AND output means of the data buffer device connected to the data bus of the second data bus group. According to the result of AND operation thus obtained, it is detected that all the data have been transferred to the device of the second device group connected to the data bus of the second data bus group.

Accordingly, there can be provided a high-speed parallel processor system capable of lightening the burden of the processor caused by observing whether data transmission and receipt are completed, and having a simple structure in which a data transmit/receive processing and a synchronous processing thereof are integrated.

In the case where the devices of the first and second device groups are processors, it is not necessary to observe whether all the data have been transferred from each processor of the first device group to each processor of the second device group. Consequently, there can be provided a high-speed parallel processor system capable of lightening the burden of the processor, and having a simple structure in which a data transmit/receive processing and a synchronous processing thereof are integrated.

In the case where each device of the first device group is a memory and each device of the second device group is a processor, it is not necessary to observe whether all the data have been transferred from the memory to the processor. Consequently, there can be provided a high-speed parallel processor system capable of lightening the burden of the processor, and having a simple structure in which a data transmit/receive processing and a synchronous processing thereof are integrated.

To achieve the above-mentioned object, the parallel processor system of the present invention comprises first and second processor groups including a plurality of processors, and a network including a plurality of channels for transferring data from each processor of the first processor group to each processor of the second processor group, wherein each of the channels has at least one relay buffer, the parallel processor system finds, for each channel, the result of AND operation of a transmit ending signal which is outputted from each processor of the first processor group for transmitting data to the channel and indicates that all the data have been transmitted from the processor, and an empty flag signal which indicates that the relay buffer of the channel has no data, and the parallel processor system detects that all the data have been transferred to each processor of the second processor group according to the result which is obtained by performing AND operation on all the results of AND operation for each channel for transferring the data to the processor of the second processor group.

With the above-mentioned structure, it is detected, in each processor of the second processor group, that the processors of the first processor group which may transfer the data to the processor of the second processor group completely transmit all the data, and that all the relay buffers of the channels have no data. Each of the channels is provided for transferring data from each processor of the first processor group to the processor of the second processor group. More specifically, it is possible to detect that the data are not transferred to the processor of the second processor group any longer.

In a network having a more general structure, accordingly, there can be provided a high-speed parallel processor system capable of lightening the burden of the processor caused by observing whether data transmission and receipt are completed, and having a simple structure in which a data transmit/receive processing and a synchronous processing thereof are integrated.

This and other objects, features and advantages of the present invention will become more apparent upon a reading of the following detailed description and drawings.

DETAILED DESCRIPTION OF THE PREFERRED EMBODIMENTS

Figure 1:
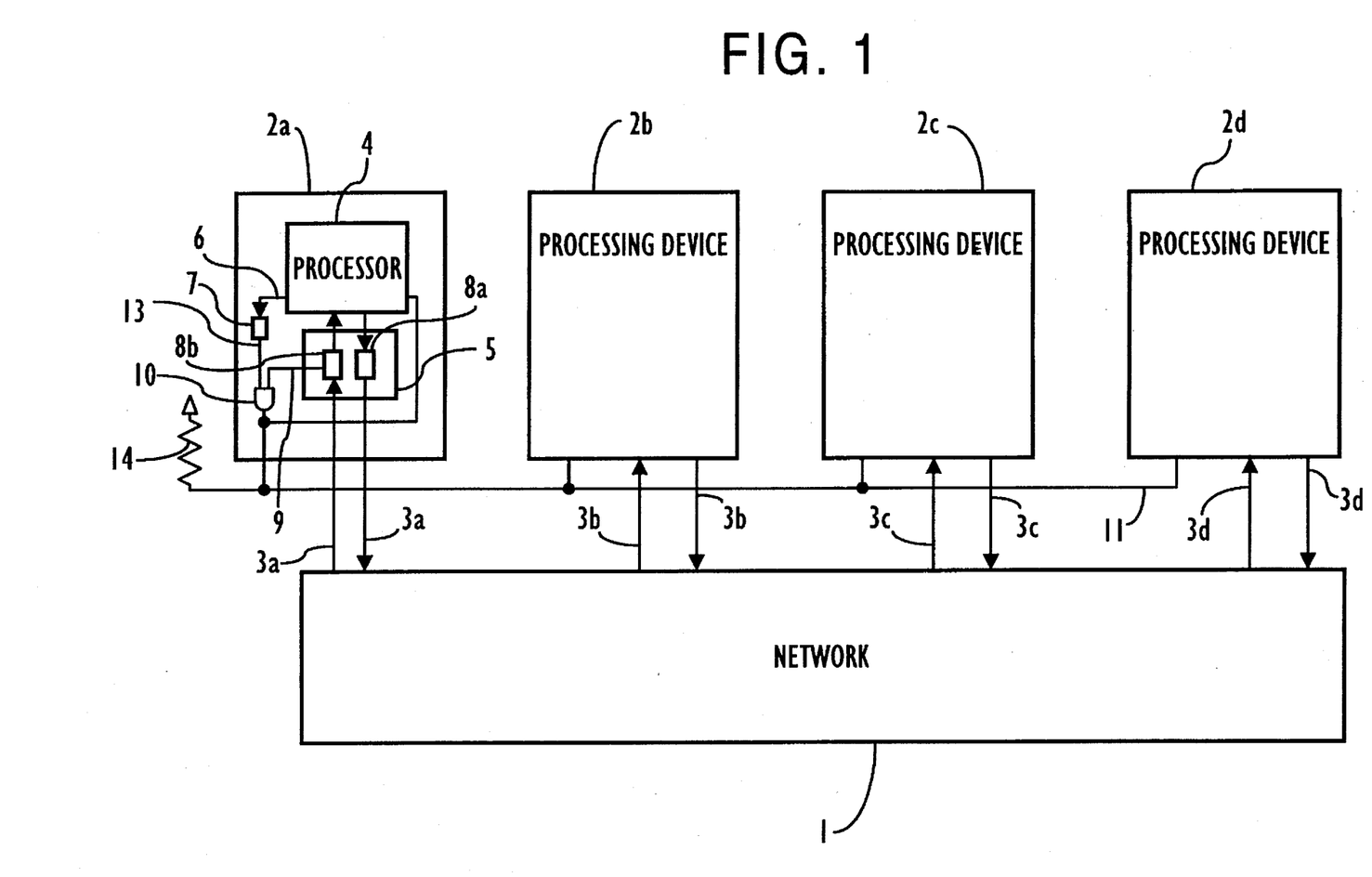
FIG. 1 is a block diagram showing a parallel processor system according to a first embodiment of the present invention.

Preferred embodiments of the present invention will be described with reference to the drawings. FIG. 1 is a block diagram showing a parallel processor system according to a first embodiment of the present invention. In FIG. 1, the parallel processor system according to the first embodiment comprises a network 1 and a plurality of processing devices 2a, 2b, 2c, 2d, ... The processing devices 2a, 2b, 2c, 2d, ... are connected to the network 1 through a plurality of data buses 3a, 3b, 3c, 3d, ... Each of the processing devices 2a, 2b, 2c, 2d, ... includes a processor 4, a router 5, a latch 7 and an AND gate 10. An ending signal line 6 is provided between the processor 4 and the latch 7. A transmit ending flag is outputted from the processor 4 to the latch 7 through the ending signal line 6. The transmit ending flag is a signal which indicates that all the transmit data have been transmitted from the processor 4 to the router 5. A transmit ending signal line 13 is provided between the latch 7 and the AND gate 10. The latch 7 receives the transmit ending flag from the processor 4 and outputs a transmit ending signal corresponding to the transmit ending flag to the AND gate 10 through the transmit ending signal line 13. The router 5 has a transmit data buffer 8a and a receive data buffer 8b. The transmit data buffer 8a receives the transmit data generated by the processor 4 therefrom. The receive data buffer 8b receives the receive data from the network 1. An empty flag output line 9 is provided between the receive data buffer 8b and the AND gate 10. An empty flag signal is outputted from the receive data buffer 8b to the AND gate 10 through the empty flag output line 9. The empty flag signal indicates that the receive data buffer 8b has no receive data from the network 1. The transmit ending signal transmitted from the latch 7 and the empty flag signal transmitted through the empty flag output line 9 are inputted to the AND gate 10 as an open collector output. A signal is outputted from the AND gate 10 to a synchronous signal line 11 connected to the processors 4 of the processing devices 2a, 2b, 2c, 2d, ... The synchronous signal line 11 is connected to a pull-up resistor 14. In the first embodiment, the AND gate 10 forms AND output means.

Figure 2:
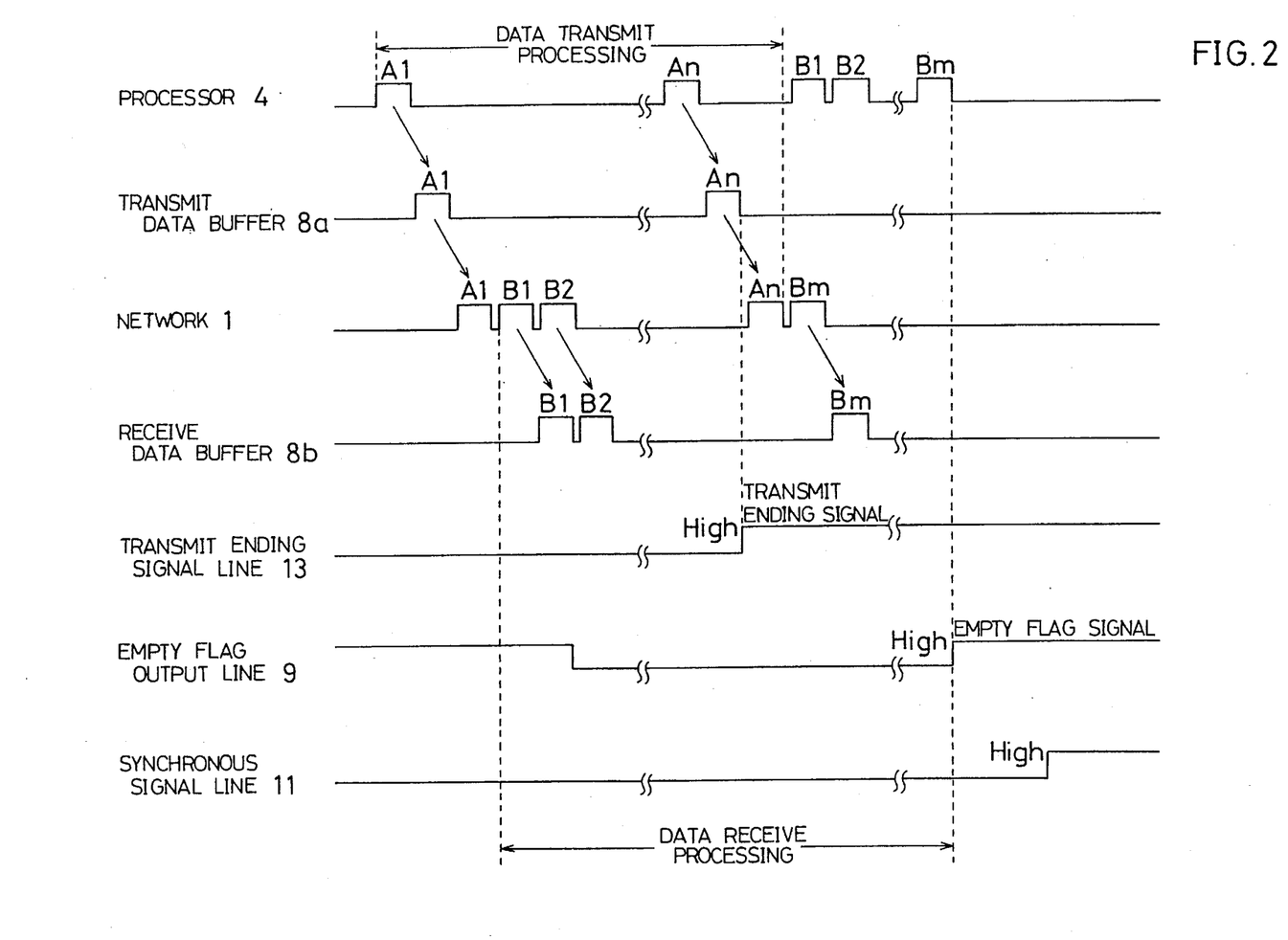
FIG. 2 is a time chart showing data transmit/receive and synchronous processings in the parallel processor system according to the first embodiment of/the present invention.

In the parallel processor system according to the first embodiment, the data transmit/receive and synchronous processings are executed among the processors 4 of the processing devices 2a, 2b, 2c, 2d, ... in the following manner. FIG. 2 is a timing chart showing the data transmit/receive and synchronous processings in the parallel processor system according to the first embodiment. As shown in FIG. 2, each of the processors 4 of the processing devices 2a, 2b, 2c, 2d, ... generates transmit data Al to An and sequentially transmits the same to the transmit data buffer 8a of the router 5. The transmit data buffer 8a of the router 5 transmits the transmit data Al to An to the network 1. When all the transmit data Al to An are transmitted, the processor 4 sets the transmit ending flag to the latch 7 through the ending signal line 6. Consequently, the latch 7 outputs a transmit ending signal corresponding to the transmit ending flag to the transmit ending signal line 13. As a result, the transmit ending signal line 13 is set to HIGH. In the case where there are receive data B1 to Bm from the network 1, the receive data buffer 8b of the router 5 sequentially receives the receive data B1 to Bm from the network 1 and holds the same therein. Then, the processor 4 fetches the receive data B1 to Bm from the receive data buffer 8b of the router 5. When all the receive data B1 to Bm of the receive data buffer 8b of the router 5 are fetched in the processor 4 so that the receive data buffer 8b of the router 5 has no receive data, the empty flag signal is outputted to the empty flag output line 9. Consequently, the empty flag output line 9 is set to HIGH. To the AND gate 10 are inputted the transmit ending signal outputted from the latch 7 and transmitted through the transmit ending signal line 13 and the empty flag signal transmitted through the empty flag output line 9. A signal set to HIGH as the result of AND operation of the empty flag signal and the transmit ending signal is outputted from the AND gate 10 to the synchronous signal line 11.

The signals as the results of AND operation which are obtained by the AND gates 10 of the processing devices 2a, 2b, 2c, 2d, ... are outputted to the synchronous signal line 11 connected to the pull-up resistor 14. Consequently, if at least one of the output signals of the AND gates 10 of the processing devices 2a, 2b, 2c, 2d, ... is set to LOW, the synchronous signal line 11 remains LOW. If all the output signals of the AND gates 10 of the processing devices 2a, 2b, 2c, 2d, ... are set to HIGH, the synchronous signal line 11 is set to HIGH. Thus, AND operation is performed on all the output signals of the AND gates 10 of the processing devices 2a, 2b, 2c, 2d, ... through the synchronous signal line 11 connected to the pull-up resistor 14.

When the synchronous signal line 11 is set to HIGH, the processors 4 of the processing devices 2a, 2b, 2c, 2d, ... detect that all the transmit data have been transmitted from the processor 4 to the transmit data buffer 8a of the router 5, and the receive data buffer 8b of the router 5 has no receive data.

In the case where a latency time for data transfer of the network 1 is 0, the state in which each of the processors 4 of the processing devices 2a, 2b, 2c, 2d, ... completely transmits all the transmit data to the router 5 and the receive data buffer 8b of the router 5 has no receive data implies that all the transmit/receive data have been transferred in the processing devices 2a, 2b, 2c, 2d, ...

According to the parallel processor system of the first embodiment, there is performed, in the processing devices 2a, 2b, 2c, 2d, ..., AND operation of a signal which indicates that the transmit data have been transmitted from the processor 4 and a signal which indicates that the receive data buffer 8b of the router 5 has no receive data. Then, the results of AND operation are outputted. In addition, AND operation is performed on all the results of AND operation outputted from the processing devices 2a, 2b, 2c, 2d, ... The result of AND operation thus obtained is returned to the processors 4 of the processing devices 2a, 2b, 2c, 2d, ... Consequently, it is possible to detect that all the transmit/receive data have been transferred and to perform a synchronous processing subsequent thereto with a simple hardware at a high speed. It is not necessary for the router 5 to count the receive data so as to detect that all the receive data have been transmitted to the processor 4. Consequently, it is not required that the processor 4 supervises the router 5. Furthermore, the hardware configuration of the router 5 can be simplified.

Figure 3:
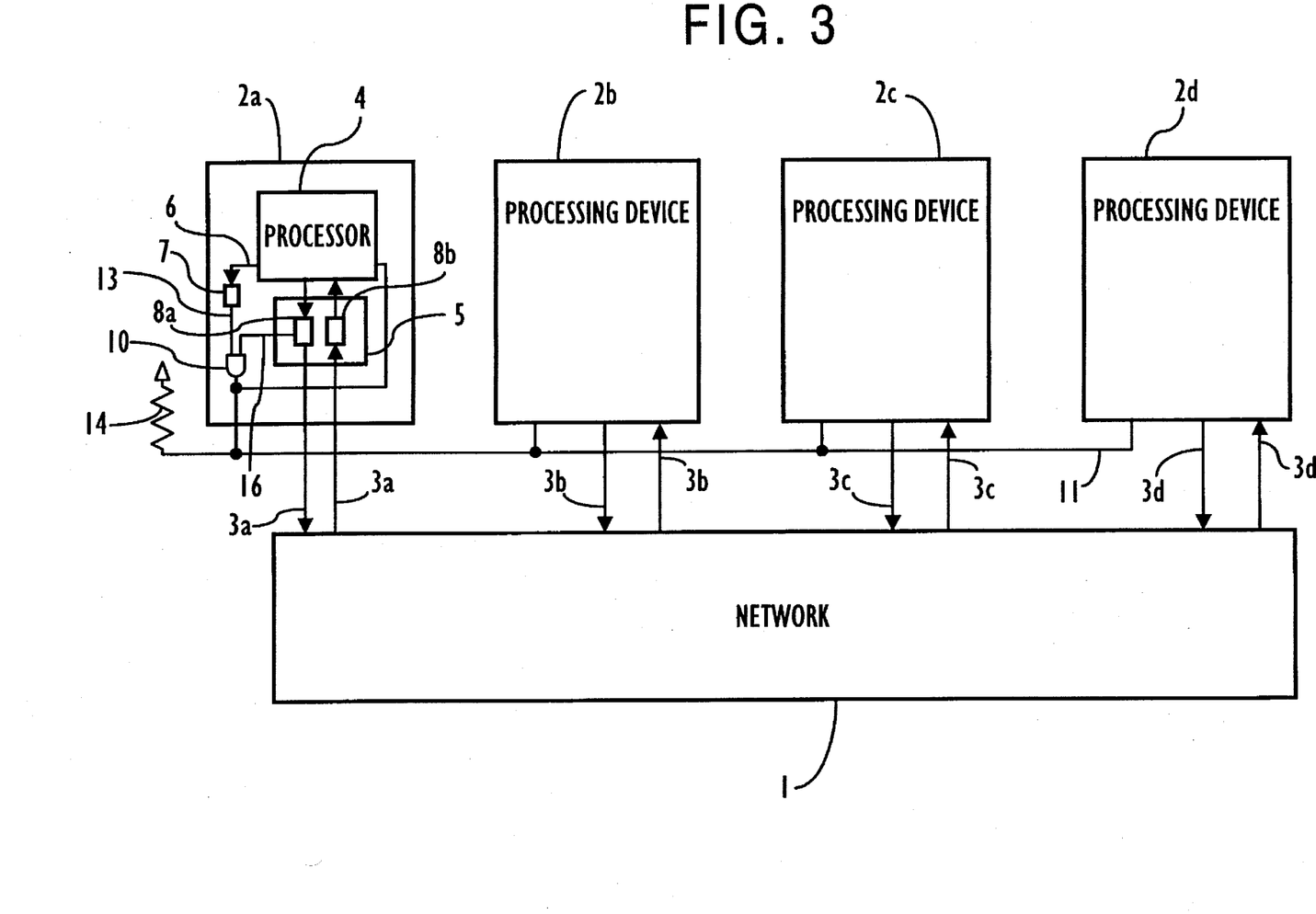
FIG. 3 is a block diagram showing a parallel processor system according to a second embodiment of the present invention.

FIG. 3 is a block diagram showing a parallel processor system according to a second embodiment of the present invention. Referring to the parallel processor system according to the second embodiment shown in FIG. 3, each of a plurality of processing devices 2a, 2b, 2c, 2d, ... includes an output line 16 between a transmit data buffer 8a of a router 5 and an AND gate 10 in place of the empty flag output line of the parallel processor system according to the first embodiment. A signal which indicates that the transmit data buffer 8a of the router 5 for receiving transmit data from a processor 4 has no transmit data is inputted as an empty flag signal to the AND gate 10 through the output line 16. The empty flag signal and a transmit ending signal are inputted to the AND gate 10. The transmit ending signal indicates that all the transmit data have been transmitted from the processor 4. An output signal set to HIGH as the result of AND operation of the empty flag signal and the transmit ending signal is outputted from the AND gate 10 to a synchronous signal line 11. When all the signals outputted from the AND gates of the processing devices 2a, 2b, 2c, 2d, ... are set to HIGH, the synchronous signal line 11 is set to HIGH. In similar to the first embodiment, if a latency time for data transfer of a network 1 is 0, the synchronous signal line 11 set to HIGH implies that all the transmit/receive data have been transferred in the processing devices 2a, 2b, 2c, 2d, ... Also in the parallel processor system according to the second embodiment, it is possible to detect that all the transmit/receive data have been transferred and to perform a synchronous processing subsequent thereto with a simple hardware at a high speed.

Figure 4:
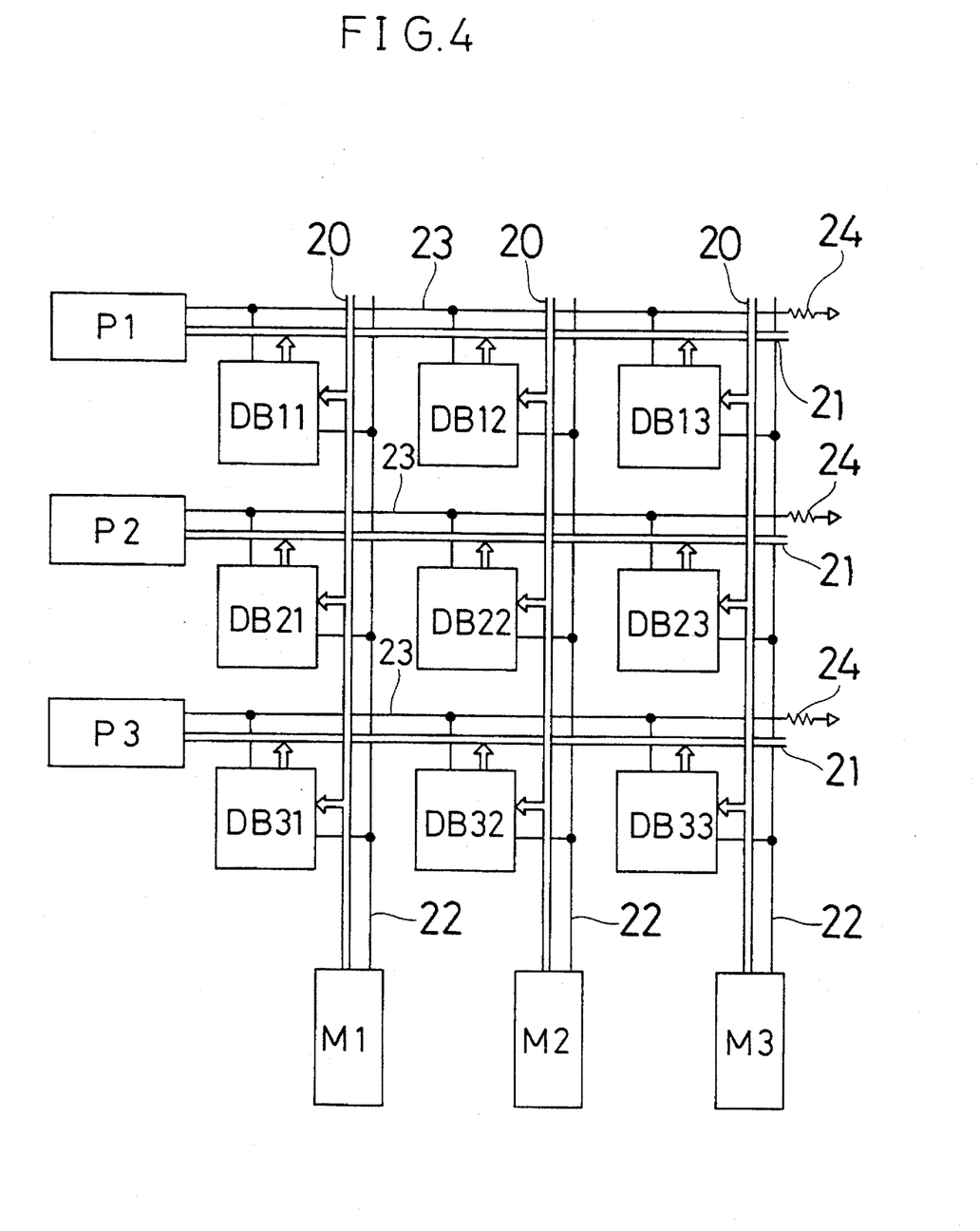
FIG. 4 is a block diagram showing a parallel processor system according to a third embodiment of the present invention.

FIG. 4 is a block diagram showing a parallel processor system according to a third embodiment of the present invention. In FIG. 4, the parallel processor system according to the third embodiment comprises memories M1, M2 and M3 forming a first device group, processors P1, P2 and P3 forming a second device group, a first data bus group including three data buses 20, and a second data bus group including three data buses 21. The data buses 20 are connected to the memories M1, M2 and M3, respectively. The data buses 21 are connected to the processors P1, P2 and P3, respectively. Data buffer devices DB11, DB12, DB13, DB21, DB22, DB23, DB31, DB32 and DB33 are provided on intersections of the data buses 20 of the first data bus group and the data buses 21 of the second data bus group, respectively. The data buses 20 of the first data bus group, the data buses 21 of the second data bus group, transmit ending signal lines 22, and transfer ending signal lines 23 are connected to the data buffer devices DB11 to DB83, respectively. Each of the memories M1, M2 and M3 is correspondingly connected to the transmit ending signal line 22. A transmit ending signal which indicates that all the data have been transmitted is outputted from each of the memories M1, M2 and M3 to the transmit ending signal line 22 connected thereto. A pull-up resistor 24 is connected to each of the transfer ending signal lines 23. A signal which indicates that all the data have been transferred from each of the data buffer devices DB11 to DB33 to each of the processors P1, P2 and P3 corresponding thereto is outputted to the transfer ending signal lines 23 connected to the data buffer devices DB11 to DB33.

Figure 5:
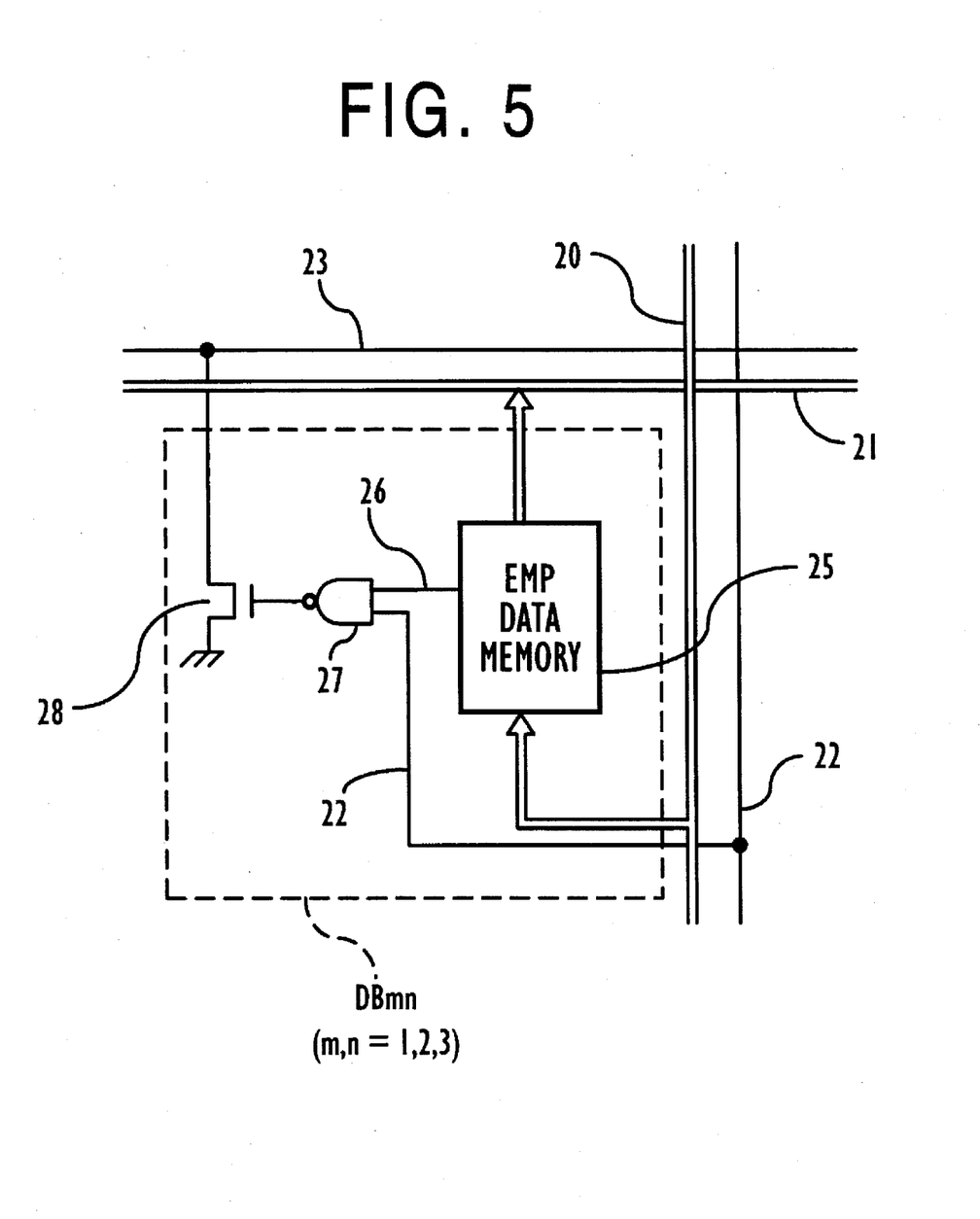
FIG. 5 is a block diagram showing a data buffer device of the parallel processor system according to the third embodiment of the present invention.

FIG. 5 is a block diagram showing the inner structure of a data buffer device DBmn (m,n=1,2,3) shown in FIG. 4. For simplicity, there will be described the data buffer device DB11. Other data buffer devices have the same structure and function as that of the data buffer device DB11. As shown in FIG. 5, the data buffer device DB11 includes a data memory 25, a NAND gate 27 and a MOS transistor 28. The NAND gate 27 and MOS transistor 28 form AND output means. The memory M1 is connected to the data memory 25 through the data bus 20 of the first data bus group. The processor P1 is connected to the data memory 25 through the data bus 21 of the second data bus group. An empty flag signal line 26 and a transmit ending signal line 22 are connected to the NAND gate 27. The empty flag signal line 26 transmits an empty flag signal which indicates that the data memory 25 has no data. The transmit ending signal line 22 is connected to the memory M1. The empty flag signal transmitted through the empty flag signal line 26 and the transmit ending signal transmitted from the memory M1 are inputted to the NAND gate 27. Accordingly, from the NAND gate 27 is outputted an inverted signal of the result of AND operation of the empty flag signal transmitted through the empty flag signal line 26 and the transmit ending signal transmitted from the memory M1. The inverted signal outputted from the NAND gate 27 is inputted to a gate of the MOS transistor 28. A source of the MOS transistor 28 is grounded. A drain of the MOS transistor 28 is connected to the transfer ending signal line 23.

A wired NOR gate is formed by the transfer ending signal line 23, the pull-up resistor 24 connected to the transfer ending signal line 23, and each of the MOS transistors 28 of the data buffer devices DB11, DB12 and DB13 connected to the transfer ending signal line 23. In other words, AND output means is formed by the NAND gate 27 and MOS transistor 28 of each of the data buffer devices DB11, DB12 and DB13. Consequently, AND operation is performed on all the results of AND operation transmitted from the AND output means of the data buffer devices DB11, DB12 and DB13 through the transfer ending signal line 23 connected to the pull-up resistor 24. Accordingly, in the case where each of the data memories 25 of the data buffer devices DB11, DB12 and DB13 connected to the processor P1 has no data and all the data have been transmitted from the memories M1, M2 and M3 to the data buffer devices DB11, DB12 and DB13, the transfer ending signal line 23 is set to HIGH. More specifically, in the case where the transfer ending signal line 23 is set to HIGH, all the data have been transferred to the processor P1.

In the parallel processor system according to the third embodiment, data transfer from the memories M1, M2 and M3 to the processor P1 and a synchronous processing are performed in the following manner. First, data are transmitted from the memories M1, M2 and M3 to the data memories 25 of the data buffer devices DB11 to DB33. When all the data are completely transmitted, the memories M1, M2 and M3 output signals set to HIGH to the NAND gates 27 of the data buffer devices DB11 to DB33 through the transmit ending signal lines 22. The data memories 25 of the data buffer devices DB11 to DB33 transfer data to the processors P1, P2 and P3. When all the data are completely transferred in each of the data buffer devices DB11 to DB33, signal set to HIGH is outputted to the NAND gate 27 through the empty flag signal lines 26 in the data buffer device. As described above, the signal set to HIGH has been inputted to the NAND gate 27 through the transmit ending signal line 22. Consequently, when the signal set to HIGH is inputted to the empty flag signal line 26, the output of the NAND gate 27 is set to LOW. When the output of the NAND gate is set to LOW, a gate of the MOS transistor 28 is turned off. When all the gates of the MOS transistors 28 of the data buffer devices DB11, DB12 and DB13 are turned off, the transfer ending signal line 23 connected to the processor P1 is set to HIGH. More specifically, to the processor P1 are inputted the result which is obtained by performing AND operation on all the results of AND operation outputted from the AND output means formed by the NAND gates 27 and MOS transistors 28 of the data buffer devices DB11, DB12 and DB13. The processor P1 detects that the transfer ending signal line 23 is set to HIGH so that all the data have been transferred to the processor P1.

To the gate of the MOS transistors 28 is outputted inverted signal of the result of AND operation of the transmit ending signal transferred from the memory corresponding to each of the data buffer devices DB11 to DB33 and the empty flag signal transmitted through the empty flag signal line 26 connected to the data memory. The data memory is connected to the data buffer device. AND operation is performed on the results of AND operation outputted from the MOS transistor 28 of the data buffer device corresponding to each of the processors P1, P2 and P3. The result of AND operation thus obtained is outputted to the processor. Such a relatively simple structure causes each of the processors P1, P2 and P3 to instantaneously know that all the data have been transferred to the processor.

According to the third embodiment, the data can be transferred from the memory to the processor, and vice versa. In the case where the data is transferred from the processor to the memory, the transmit ending signal line 22 and transfer ending signal line 23 can independently be provided in their transfer directions, and can easily be used together. While data transfer between the processors and memories has been described in the third embodiment, data can be transferred between the processors so as to obtain the same effects.

Figure 6:
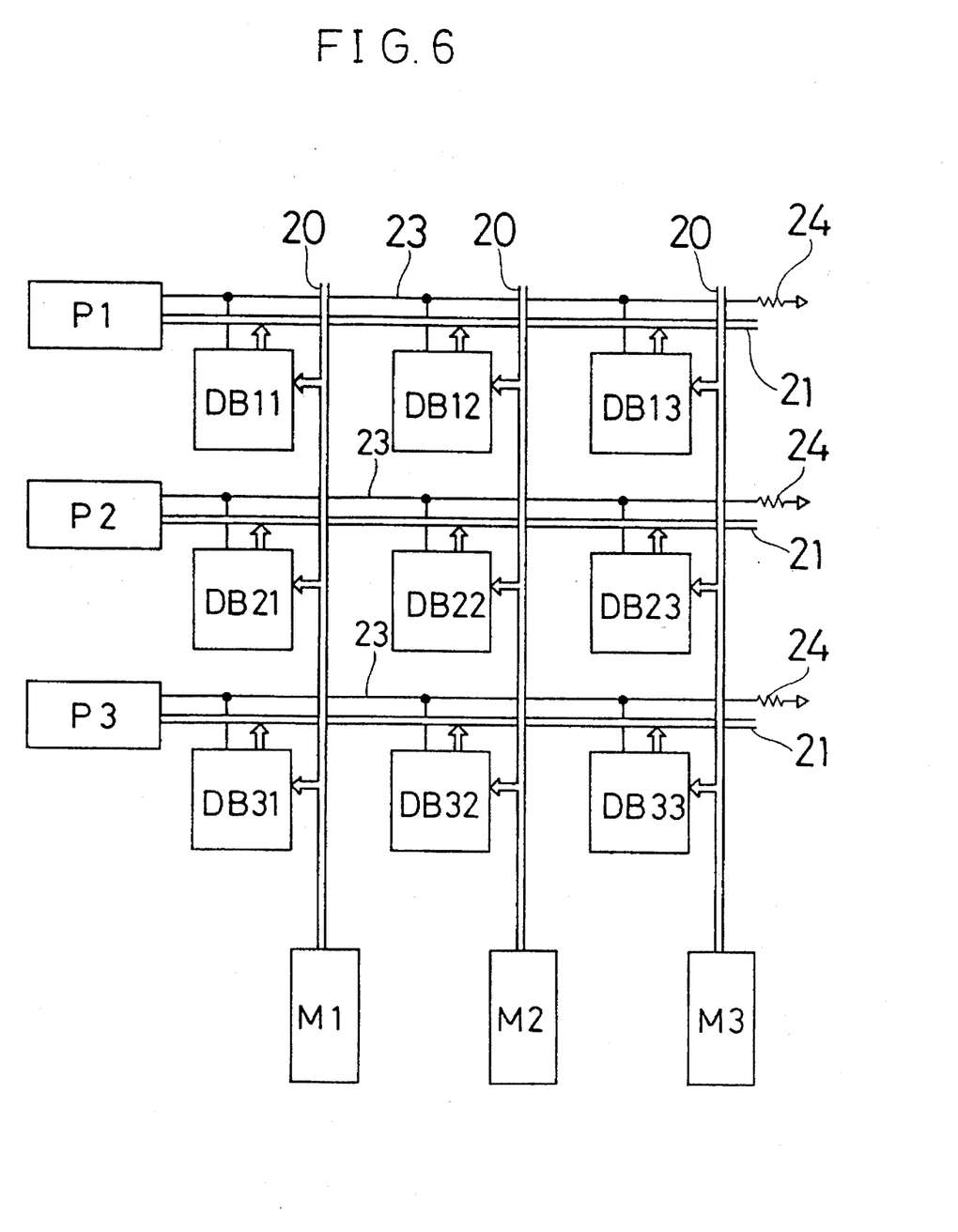
FIG. 6 is a block diagram showing a parallel processor system according to a fourth embodiment of the present invention.
Figure 7:
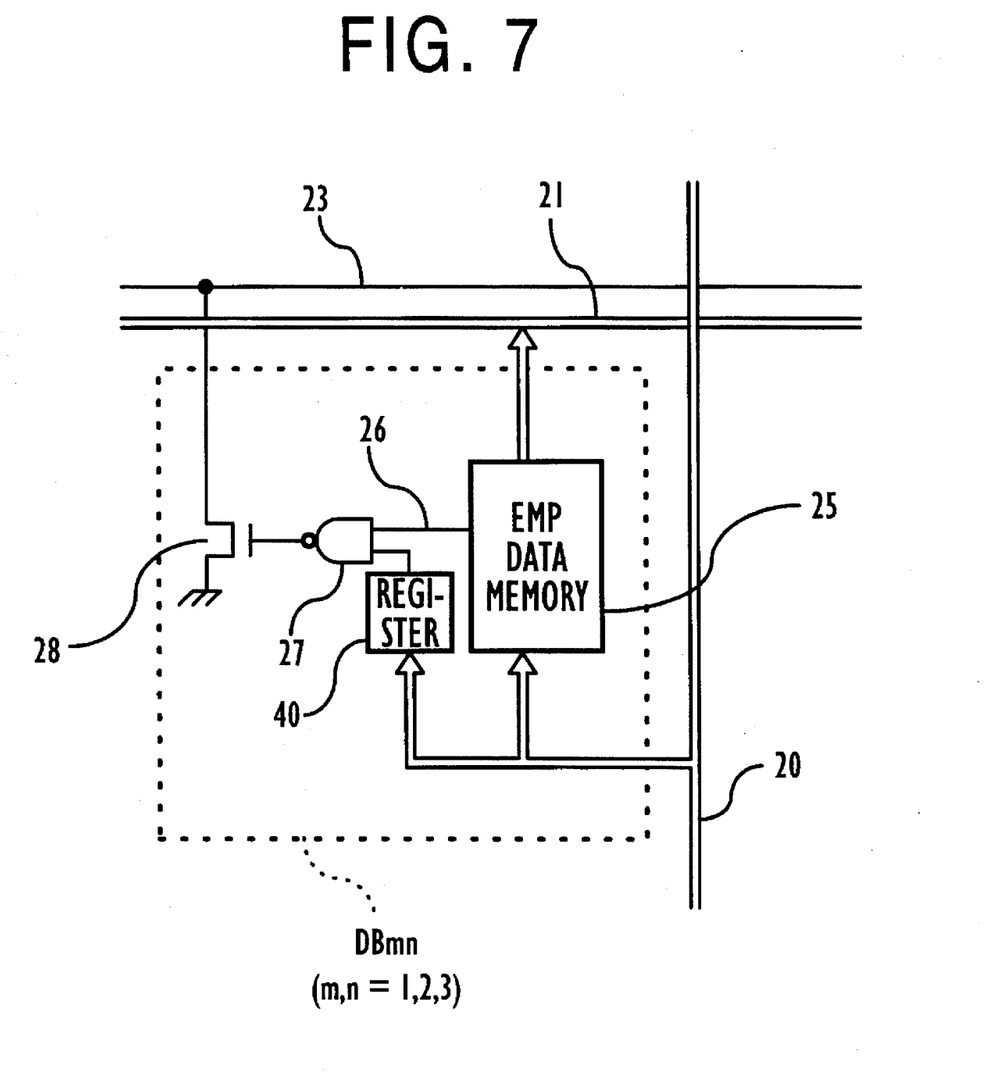
FIG. 7 is a block diagram showing a data buffer device of the parallel processor system according to the fourth embodiment of the present invention.

FIGS. 6 and 7 are block diagrams showing a parallel processor system according to a fourth embodiment of the present invention. The parallel processor system of the fourth embodiment is the same as that of the third embodiment, except that the transmit ending signal line 22 is not provided as shown in FIG. 6, and each of the data buffer devices DB11 to DB33 includes an ending indication register 40 for outputting a transmit ending signal which indicates that all the data have been transferred from a correspondent memory based on data set by the memory as shown in FIG. 7. In the parallel processor system according to the fourth embodiment shown in FIGS. 6 and 7, the same reference numerals are given to components corresponding to those of the parallel processor system according to the third embodiment shown in FIGS. 4 and 5.

Referring to the parallel processor system according to the third embodiment, it is possible to detect that all the data have been transferred from each of the memories M1, M2 and M3 to the data buffer devices corresponding thereto in response to the transmit ending signal transmitted from the memory. Referring to the parallel processor system according to the fourth embodiment, data which indicate that all the data have been transmitted from each of the memories M1, M2 and M3 is written to the ending indication registers 40 of the data buffer devices connected to data bus 20 of a first data bus group. The data bus 20 of the first data bus group connect the memory to the data buffer devices corresponding thereto. In the data buffer devices, consequently, a transmit ending signal which indicates that all the data have been transmitted from the memory is outputted from the ending indication register 40. In similar to the third embodiment, AND operation is performed on the transmit ending signal outputted from the ending indication register 40 of each of the data buffer devices DB11 to DB33 and an empty flag signal transmitted through an empty flag signal line 26 connected to a data memory 25 of each of the data buffer devices DB11 to DB33. The result of AND operation are outputted to a transmit ending signal line 23 through a MOS transistor 28. The function and effect of the parallel processor system according to the fourth embodiment are almost the same as those of the parallel processor system according to the third embodiment. It is not necessary for the parallel processor system according to the fourth embodiment to have the transmit ending signal line 22 which is adopted in the parallel processor system according to the third embodiment. Consequently, the structure of the parallel processor system according to the fourth embodiment can be simplified.

Also in the fourth embodiment, the data can be transferred from the memory to the processor, and vice versa. In the case where the data is transferred from the processor to the memory, it is necessary to add a signal line corresponding to the transfer ending signal line 23 to the data buffer device corresponding to the memory. While data transfer between the processors and memories has been described in the fourth embodiment, data can be transferred between the processors so as to obtain the same effects.

Figure 8:
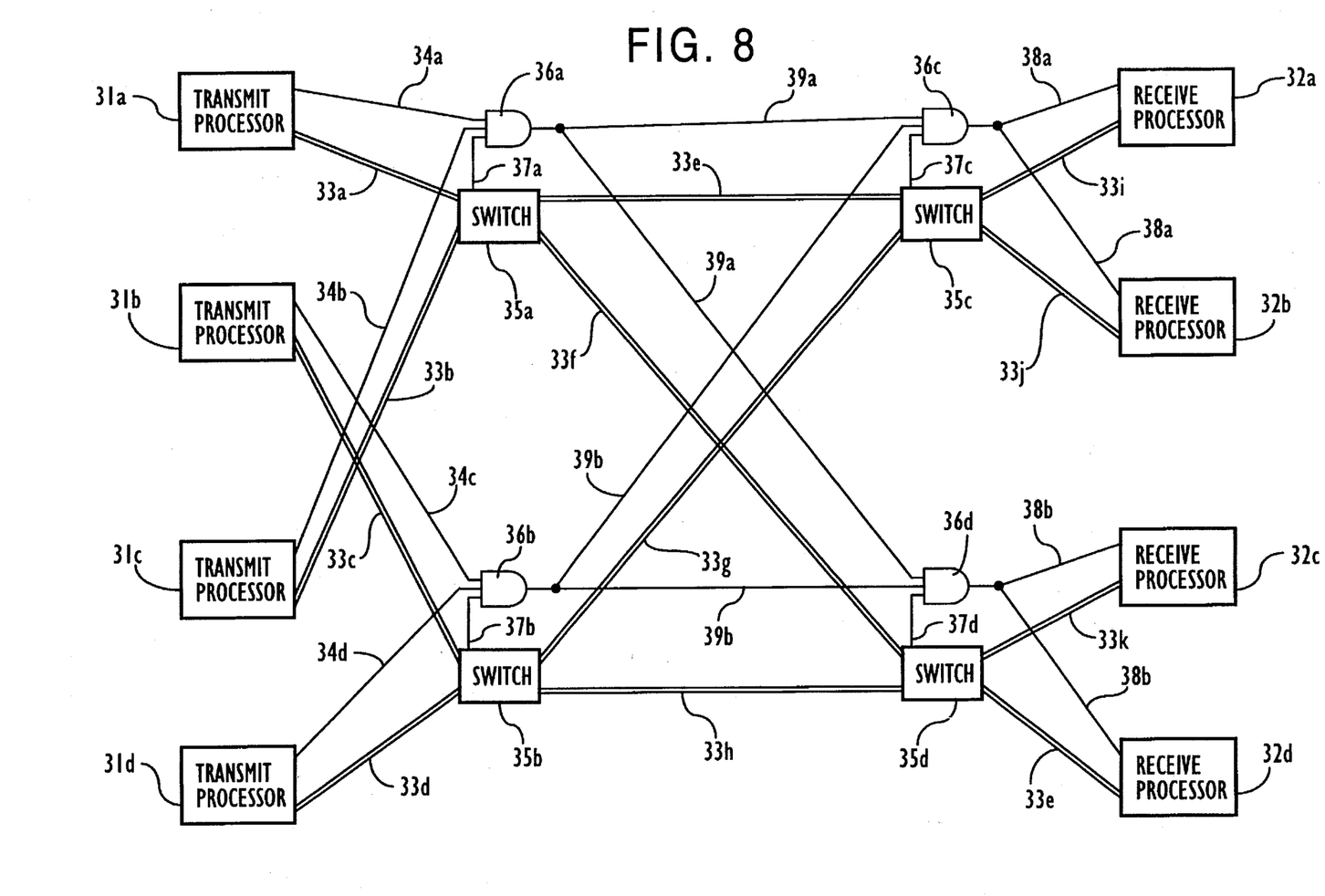
FIG. 8 is a block diagram showing a parallel processor system according to a fifth embodiment of the present invention.

The present invention is not limited to the parallel processor systems according to the above-mentioned embodiments. In general, the parallel processor systems according to the above-mentioned embodiments have a structure in which the processor outputs a transmit ending signal which indicates that all the data have been transmitted from the processor and a signal which indicates that all the relay buffers of the network have no data. Such a parallel processor system can be structured such that AND operation is performed, in the receive processor for receiving data from the network, on the transmit ending signal of the transmit processor for transmitting data to the network so as to transfer the data to the receive processor, and a signal indicating that all the relay buffers on the channels through which the data is transferred from the transmit processor to the receive processor have no data. An example of the parallel processor system having such a general structure will be described with reference to the drawings. FIG. 8 is a block diagram showing a parallel processor system according to a fifth embodiment of the present invention, In FIG. 8, the reference numerals 31a, 31b, 31c and 31d denote transmit processors, the reference numerals 32a, 32b, 32c and 32d denote receive processors, the reference numerals 33a to 33l are data buses, the reference numerals 35a, 35b, 35c and 35d denote switches as relay buffers, and the reference numerals 36a, 36b, 36c and 36d denote AND gates. The transmit processors 31a to 31d are connected to the receive processors 32a to 32d through an omega network. The omega network is formed by the data buses 33a to 33l and the switches 35a to 35d. The reference numerals 34a, 34b, 34c and 34d denote transmit ending signal lines which are connected to the transmit processors 31a to 31d, respectively. The reference numerals 39a and 39b denote relay signal lines. The reference numerals 38a and 38b denote ending detection signal lines. The reference numerals 37a, 37b, 37c and 37d denote empty flag signal lines which are connected to the switches 35a to 35d, respectively. The transmit ending signal lines 34a to 34d, the relay signal lines 39a and 39b, and the ending detection signal lines 38a and 38b are connected to one another through the AND gates 36a to 36d in similar to the omega network. A transmit ending signal which indicates that all the data have been transmitted to the data busses is outputted from each of the transmit processors 31a to 31d to the transmit ending signal lines connected thereto. A signal which indicates that each of the switches 35a to 35d has no data is outputted from the switch to the empty flag signal line connected thereto.

There will be described the processing of transferring data to the receive processor 32a in the parallel processor system according to the fifth embodiment. Similarly, there is performed the processing of transferring data to the receive processors 32b, 32c and 32d. Data generated by the transmit processor 31a is transmitted to the switch 35a through the data bus 33a, and then transferred to the switch 35c through the data bus 33e, and received by the receive processor 32a through the data bus 33l. A channel is formed by the data buses 33a, 33e and 33i, and the switches 35a and 35c. Similarly, data transfer is performed between the transmit processor 31b and the receive processor 32a through a channel formed by the data buses 33c, 33g and 33i, and the switches 35b and 35c. Data transfer is performed between the transmit processor 31c and the receive processor 32a through a channel formed by the data buses 33b, 33e and 33i, and the switches 35a and 35c. Data transfer is performed between the transmit processor 31d and the receive processor 32a through a channel formed by the data buses 33d, 33g and 33i, and the switches 35b and 35c. Thus, the processing of transferring data to the receive processor 32a is performed through four channels.

In the parallel processor system according to the fifth embodiment, in the case where the transmit ending signal is outputted from each of the transmit processors 31a to 31d and the signal which indicates that each of the switches 35a, 35b and 35c has no data is outputted therefrom; the ending detection signal line 38a connected to the receive processor 32a is set to HIGH. In other words, the receive processor 32a can detect that all the data of the transmit processors 31a to 31d have been transferred to the receive processor 32a and the switches 35a, 35b and 35c on the four channels have no data in response to a signal set to HIGH outputted to the ending detection signal line 38a which is connected to the receive processor 32a. The receive processors 32b, 32c and 32d can perform the same processing.

Accordingly, the parallel processor system according to the fifth embodiment can detect that data transfer is completed with a relatively simple structure.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A parallel processor system comprising;

a plurality of processing devices;

a data network, having a plurality of inputs and a plurality of outputs, for connecting said processing devices to one another and for exchanging messages generated by said processing devices among said processing devices; and a control network, having a plurality of inputs for connecting said control network to said processing devices and an output, said control network for performing a logical AND operation on all said control network inputs and for providing the result of said logical AND operation to said control network output, wherein each of said processing devices includes:

a router having a send buffer for transmitting messages stored in said send buffer to other processing devices through said data network, a receive buffer for receiving and storing messages transmitted by send buffers of other processing devices through said data network, said receive buffer having an output for providing a signal that indicates when said receive buffer is empty, a processor for receiving messages from said receive buffer of said router and for transmitting messages to said send buffer of said router, said processor having an output for providing a signal that indicates when said processor has completed the transmission of messages to said send buffer, a latch for storing said message transmission completion signal from said processor and for outputting a transmit termination signal, and an AND-gate means for receiving said transmit termination signal from said latch and said empty buffer signal from said receive buffer, and for outputting to one of said plurality of inputs of said control network a transmit completion signal in response to AND operation of said transmit termination signal from said latch and said empty buffer signal from said receive buffer, wherein said output of said control network is connected to each of said processors for providing a signal to each of said processors indicating that each processing device has completed processing messages and that each processor can simultaneously resume a subsequent processing function.

2. A parallel processor system comprising;

a plurality of processing devices;

a data network, having a plurality of inputs and a plurality of outputs, for connecting said processing devices to one another and for exchanging messages generated by said processing devices among said processing devices; and a control network, having a plurality of inputs for connecting said control network to said processing devices and an output, said control network for performing a logical AND operation on all said control network inputs and for providing the result of said logical AND operation to said control network output, wherein each of said processing devices includes:

a router having a send buffer for transmitting messages stored in said send buffer to other processing devices through said data network, a receive buffer for receiving and storing messages transmitted by send buffers of other processing devices through said data network, said send buffer having an output for providing a signal that indicates when said send buffer is empty, a processor for receiving messages from said receive buffer of said router and for transmitting messages to said send buffer of said router, said processor having an output for providing a signal that indicates when said processor has completed the transmission of messages to said send buffer, a latch for storing said message transmission completion signal from said processor and for outputting a transmit termination signal, and an AND-gate means for receiving said transmit termination signal from said latch and said empty buffer signal from said send buffer, and for outputting to one of said plurality of inputs of said control network a transmit completion signal in response to AND operation of said transmit termination signal from said latch and said empty buffer signal from said send buffer, wherein said output of said control network is connected to each of said processors for providing a signal to each of said processors indicating that each processing device has completed processing messages and that each processor can simultaneously resume a subsequent processing function.

* * * * *